(12) United States Patent
Chang (10) Patent No.: US 10,800,206 B2
(45) Date of Patent: Oct. 13, 2020

(54) QUICK-RELEASE STRUCTURE (71) Applicant: SHUN XIN CO., LTD., Taichung (TW)

(72) Inventor: Chin-Chao Chang, Taichung (TW)

( * ) Notice: Subject to any disclaimer, the term of this patent is extended or adjusted under 35 U.S.C. 154(b) by 281 days.

(21) Appl. No.: 15/992,186

(22) Filed: May 30, 2018

(65) Prior Publication Data
US 2019/0135035 A1 May 9, 2019

(30) Foreign Application Priority Data

Jun. 14, 2017 (TW) .............................. 106119816 A (51) Int. Cl.
B60B 27/02 (2006.01)
B60B 35/00 (2006.01)
B62K 25/02 (2006.01)

(52) U.S. Cl.
CPC .......... B60B 27/026 (2013.01); B60B 35/004 (2013.01); B62K 25/02 (2013.01); B60B 2900/112 (2013.01); B60B 2900/115 (2013.01); B60B 2900/325 (2013.01); B60B 2900/3312 (2013.01); B60B 2900/531 (2013.01)

(58) Field of Classification Search
CPC ... B60B 27/026; B60B 35/04; B62K 2206/00; B62K 25/02; B62K 2025/025
See application file for complete search history.

(56) References Cited

U.S. PATENT DOCUMENTS

| 5,526,661 | A  | * | 6/1996  | Lin ........................ | B62H 5/001 301/110.5 |
| 9,493,034 | B1 | * | 11/2016 | Ueda ..................... | B60B 27/026 |
| 9,994,071 | B2 | * | 6/2018  | Nakajima ............... | B62K 25/02 |
| 2007/0052285 | A1 | * | 3/2007 | Montague ............. | B60B 27/026 301/124.1 |
| 2008/0211296 | A1 | * | 9/2008 | Takachi ................ | B60B 27/026 301/124.2 |
| 2009/0121538 | A1 | * | 5/2009 | Chang .................... | B62K 25/02 301/124.2 |
| 2012/0321370 | A1 | * | 12/2012 | Chang .................... | B62K 25/02 403/18 |
| 2012/0321373 | A1 | * | 12/2012 | Chang .................... | B62K 25/02 403/106 |
| 2013/0334871 | A1 | * | 12/2013 | Chang .................. | B60B 27/026 301/124.2 |
| 2014/0319799 | A1 | * | 10/2014 | Liu ........................ | B62K 25/02 280/263 |
| 2015/0144009 | A1 | * | 5/2015 | Schlanger ............. | B60B 27/026 99/421 R |
| 2018/0281892 | A1 | * | 10/2018 | Chang .................... | F16B 2/185 |

* cited by examiner

*Primary Examiner* — Kip T Kotter (57) ABSTRACT

A quick-release structure has: a shaft lever having a shaft lever external thread at one end thereof and a shaft lever internal thread at the other end thereof; a fixed seat sheathed on the shaft lever in a non-rotatable manner relative to each other. The fixed seat has an annular fixed seat engaging tooth on one end face thereof; a movable seat having an axially penetrating perforation, wherein the movable seat has an annular movable seat engaging tooth on one end face thereof, and the movable seat engaging tooth faces the fixed seat engaging tooth of the fixed seat; a spring abutting between the fixed seat and the movable seat; a spanner rod having a pivoting hole; and a connecting shaft, one end of which abuts on the spanner rod, and the other end of which has a connecting shaft external thread.

9 Claims, 7 Drawing Sheets

QUICK-RELEASE STRUCTURE

FIELD OF THE INVENTION

The invention relates to a component of a bicycle, and more specifically to a quick-release structure.

BACKGROUND OF THE INVENTION

A quick-release structure of a bicycle is mainly used to allow quick assembling and disassembling of a wheel and a frame (or a fork on the frame).

There are various types of bicycles such as mountain bicycles, snow bicycles, downhill bicycles and road bicycles. For a quick-release structure used in a mountain bicycle or a downhill bicycle requiring significant impact strength, an external thread is disposed at one end of a shaft lever and then directly screwed to an internal thread of a frame, thereby improving the impact strength. However, such quick-release structure screwed and locked to the frame by means of threads has the disadvantages that the tension can only be adjusted by a one-side spanner rod, and thus the position of the spanner rod cannot be easily controlled. If the spanner rod is orientated downwards, the quick-release structure may be disengaged due to impact on the spanner rod by foreign matter, but if the spanner rod is forcibly secured upwards, the engagement may be too loose or too tight.

Accordingly, there are currently many fine-adjustable quick-release structures on the market, which are mainly achieved as follows: a fine-adjustable unit is added between a shaft lever and a spanner rod, and the disengagement and engagement of the fine-adjustable unit can result in some tiny gaps between such quick-release structure and a frame fork to serve as a space for allowing the spanner rod to be rotated again and then wrenched. However, when the disengagement and engagement of the fine-adjustable unit result in gaps between such quick-release structure and the frame fork and then the quick-release structure is pressed again, actually the frame fork is tightly pressed, released and then tightly pressed, which is the process of repeated secondary tight pressing for the frame fork, such that the frame fork and the quick-release structure are easily damaged after long-term use, thus reducing the service life. Besides, the components of the fine-adjustable unit of such quick-release structure are too numerous and complicated, which not only results in higher manufacturing cost, but also hence increases the selling price, thereby losing the market competitiveness.

SUMMARY OF THE INVENTION

In view of this, in order to solve the problems in the prior art that a conventional quick-release structure is prone to repeatedly press a frame fork to cause damage to the frame fork and the quick-release structure and hence reduce the service life, and components are too complicated to result in high manufacturing cost and hence lose the market competitiveness, the invention provides a quick-release structure, comprising: a shaft lever having a shaft lever external thread at one end thereof and a shaft lever internal thread at the other end thereof; a fixed seat sheathed on the shaft lever in a non-rotatable manner relative to each other, wherein the fixed seat has an annular fixed seat engaging tooth on one end face thereof; a movable seat having an axially penetrating perforation, wherein the movable seat has an annular movable seat engaging tooth on one end face thereof, and the movable seat engaging tooth faces the fixed seat engaging tooth of the fixed seat; a spring abutting between the fixed seat and the movable seat; a spanner rod having a pivoting hole; and a connecting shaft, one end of which abuts on the spanner rod, and the other end of which has a connecting shaft external thread and sequentially passes through the pivoting hole of the spanner rod, the perforation of the movable seat and the spring so as to be screwed into the shaft lever internal thread of the shaft lever. When the spanner rod presses the movable seat, the movable seat engaging tooth of the movable seat is engaged with the fixed seat engaging tooth of the fixed seat; and when the spanner rod releases the movable seat, the movable seat is pushed away by the spring such that the movable seat engaging tooth is disengaged from the fixed seat engaging tooth. Accordingly, the above arrangement can achieve the effects of preventing the components and the bicycle fork from being easily damaged, increasing the service life, simplifying the components, providing low manufacturing cost and having the market competitiveness.

DETAILED DESCRIPTION OF THE INVENTION

In order that the examiner can have a still further understanding and recognition of the features and characteristics of the invention, the following preferred embodiments will be listed and described below with reference to the drawings.

Referring to FIGS. 1 to 6, a quick-release structure 100 provided by a preferred embodiment of the invention mainly comprises a shaft lever 10, a fixed seat 20, a movable seat 30, a spring 40, a spanner rod 50 and a connecting shaft 60.

Figure 1:
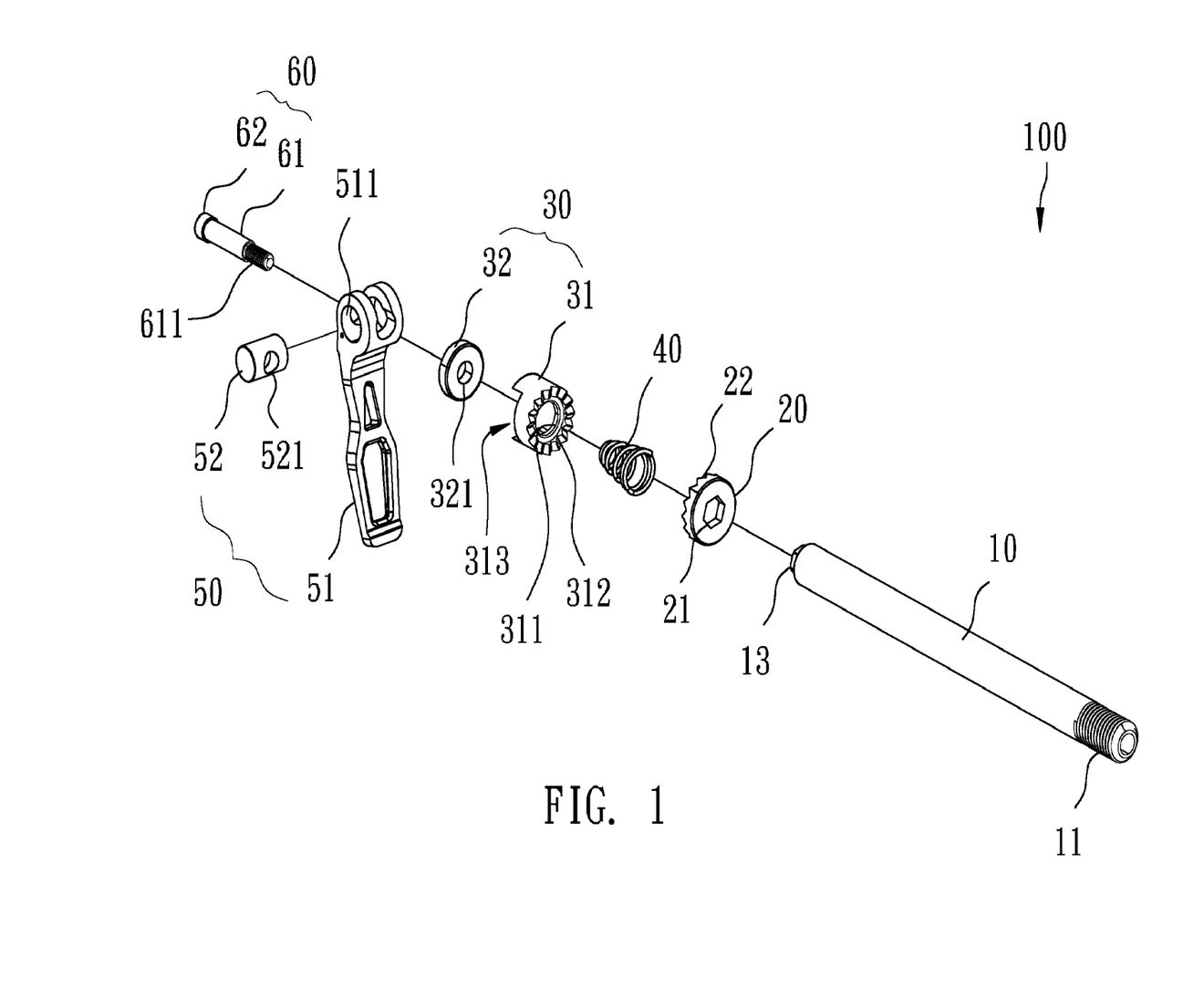
FIG. 1 is an exploded perspective view of a preferred embodiment of the invention.
Figure 2:
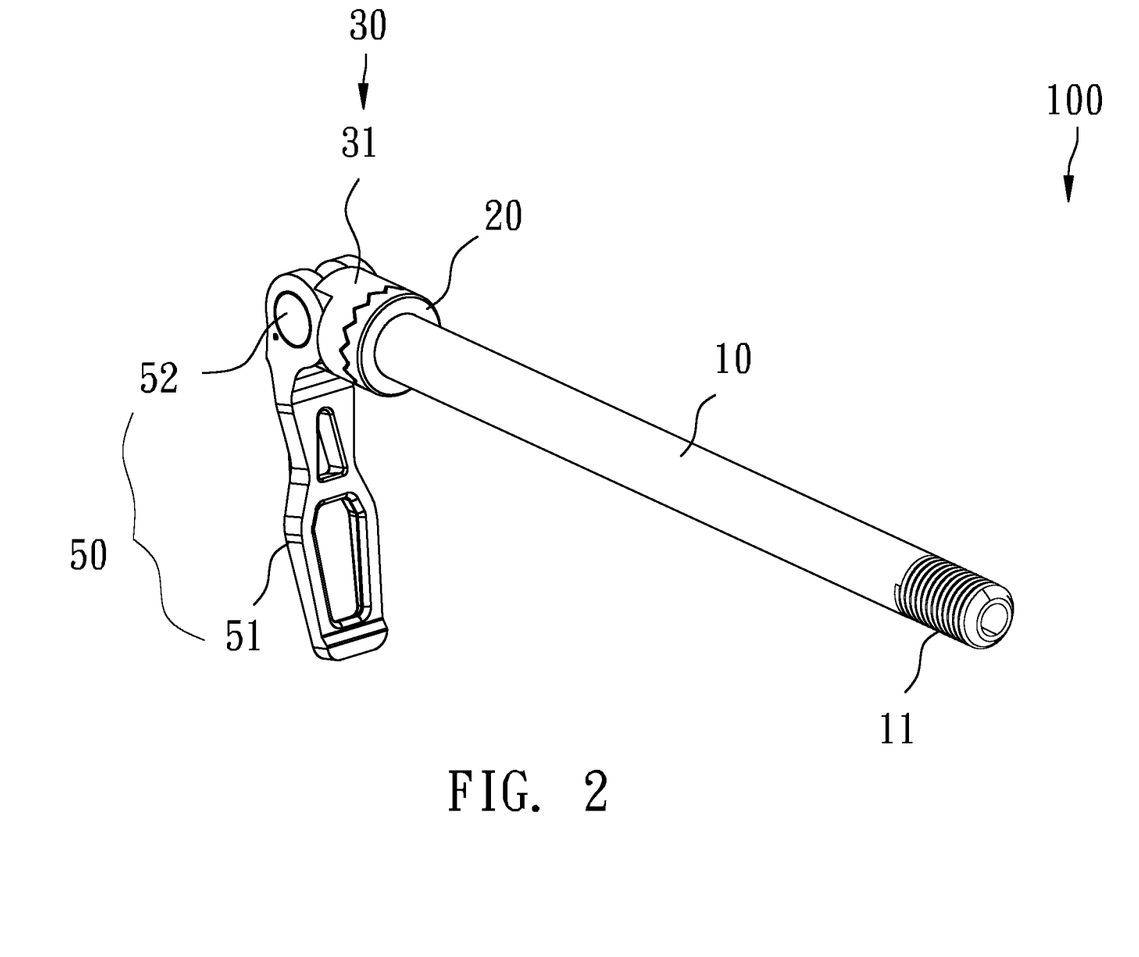
FIG. 2 is an assembled perspective view of the embodiment shown in FIG. 1.
Figure 3:
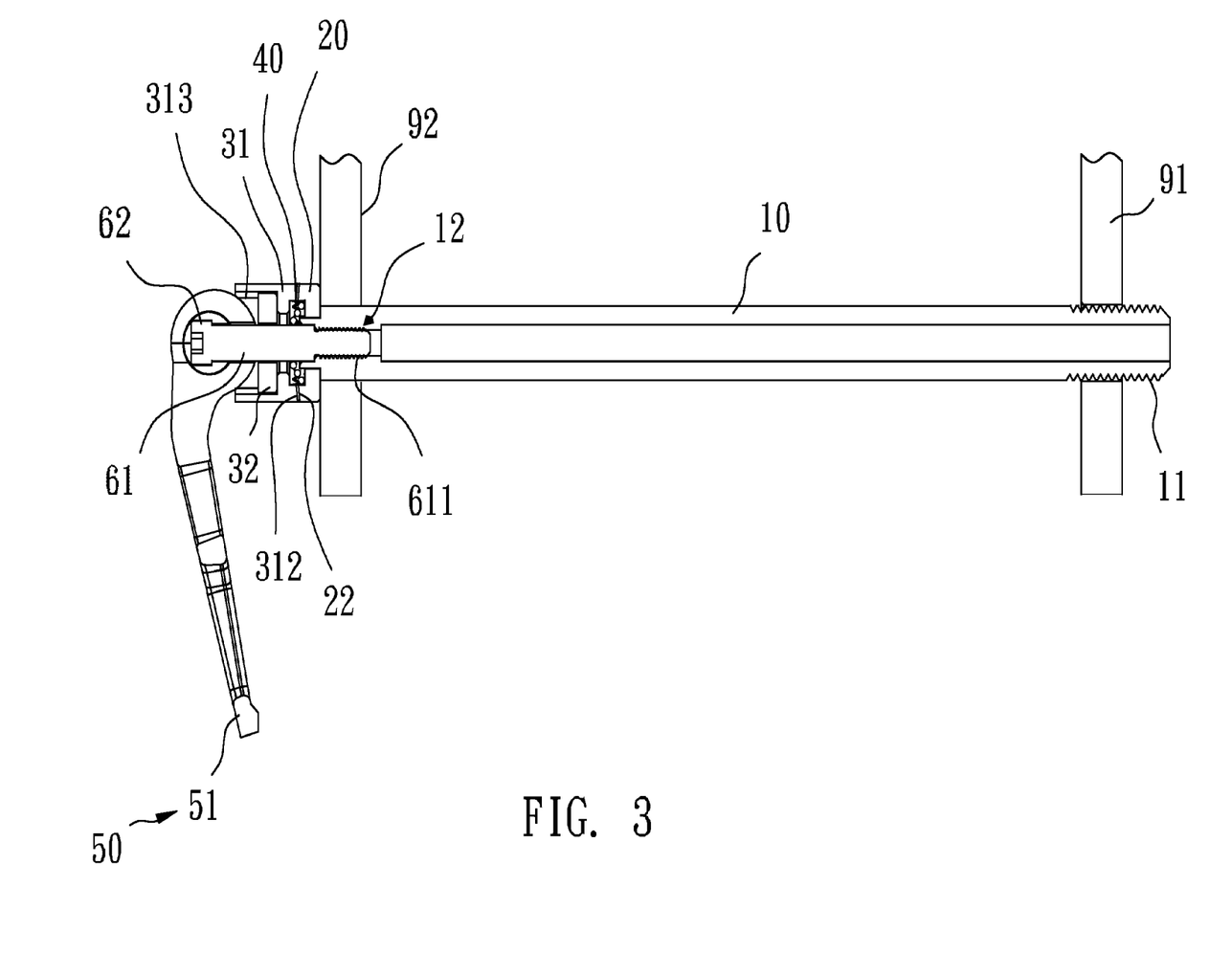
FIGS. 3 to 6 are schematic operation views of the embodiment shown in FIG. 1.

Referring to FIGS. 1 to 3, the shaft lever 10 has a shaft lever external thread 11 on an outer circumferential surface of one end thereof and has a shaft lever internal thread 12 and a rotation limiting portion 13 at the other end thereof, wherein the rotation limiting portion 13 is located on the same end face as the shaft lever internal thread 12 and has a non-circular section. In the embodiment, the rotation limiting portion 13 is a hexagonal column.

Referring to FIGS. 1 to 3, the fixed seat 20 has an axially penetrating rotation limiting hole 21, a section of the rotation limiting hole 21 is complementary to that of the rotation limiting portion 13 of the shaft lever 10, the rotation limiting hole 21 is a hexagonal hole in the embodiment, the fixed seat 20 has an annular fixed seat engaging tooth 22 on one end face thereof, and the rotation limiting hole 21 of the fixed seat 20 is provided for the rotation limiting portion 13 of the shaft lever 10 to pass through such that the rotation limiting hole 21 is sheathed with the rotation limiting portion 13 to allow the fixed seat 20 to be sheathed with the shaft lever 10 in a rotation limiting manner (i.e. the fixed seat and the shaft lever cannot rotate relative to each other).

Referring to FIGS. 1 to 3, the movable seat 30 has a seat body 31 and a pressing block 32. The seat body 31 has an axially penetrating perforation 311, and has an annular movable seat engaging tooth 312 on one end face thereof, a pressing chamber 313 communicated with the perforation 311 is recessed on the other end face thereof, and the aperture of the pressing chamber 313 is greater than that of the perforation 311. The pressing block 32 is disposed in the pressing chamber 313 of the seat body 31 and has an axially penetrating through hole 321, the through hole 321 is communicated with the perforation 311, the pressing block 32 is elastic and integrally made of rubber, and the outer diameter of the pressing block 32 is smaller than the inner diameter of the pressing chamber 313 but greater than the aperture of the perforation 311. The movable seat engaging tooth 312 of the movable seat 30 faces the fixed seat engaging tooth 22 of the fixed seat 20.

Referring to FIGS. 1 to 3, the spring 40 abuts between the fixed seat 20 and the seat body 51 of the movable seat 50.

Referring to FIGS. 1 to 3, the spanner rod 50 has a rod body 51 and a pivoting seat 52. The rod body 51 has a pivoting chamber 511 at one end thereof, and the pivoting seat 52 is arranged in the pivoting chamber 511 of the rod body 51 in a movable pivoting manner. The pivoting seat 52 has a penetrating pivoting hole 521.

Referring to FIGS. 1 to 3, the connecting shaft 60 has a body 61 and a head 62 connected at one end of the body 61, wherein the outer diameter of the head 62 is greater than that of the body 61, and the body 61 has a connecting shaft external thread 611. The body 61 of the connecting shaft 60 sequentially passes through the pivoting hole 521 of the spanner rod 50, the through hole 321 of the movable seat 30, the perforation 311 and the spring 40 so as to be screwed into the shaft lever internal thread 12 of the shaft lever 10, and the head 62 abuts on the pivoting seat 52 of the spanner rod 50, such that the spanner rod 50 can be rotated and pulled relative to the connecting shaft 60.

Accordingly, various components and members of a quick-release structure 100 provided by a preferred embodiment of the invention as well as their assembling ways have been introduced above, and then their use characteristics will be described below.

When the invention is to be used, firstly, the shaft lever 10 passes through two fork levers 91, 92 of a bicycle, as shown in FIG. 3, the shaft lever external thread 11 of the shaft lever 10 is screwed to one fork lever 91, and the fixed seat 20 is forcibly connected to the another fork lever 92 by rotating the spanner rod 30.

Figure 4:
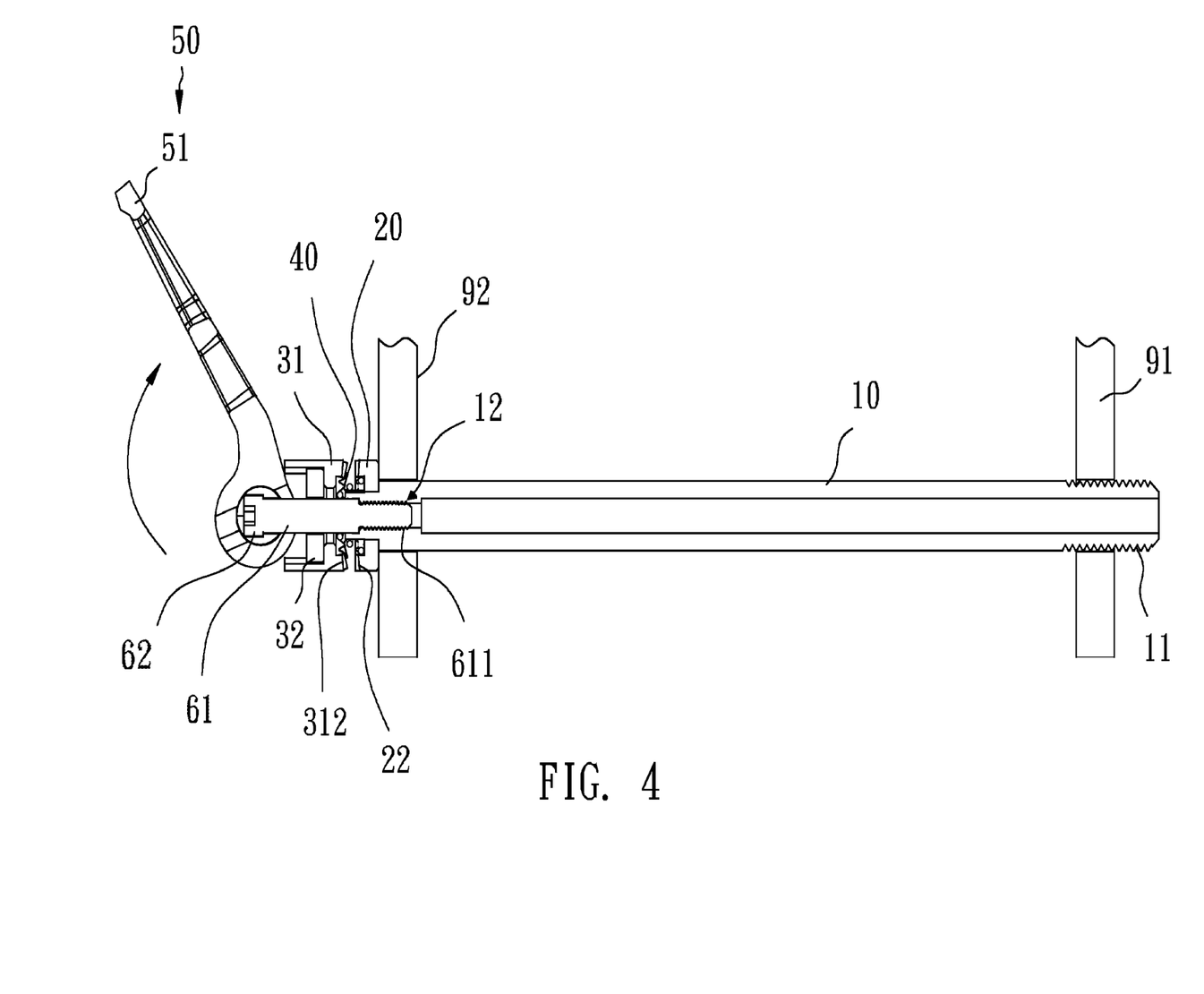

After the fixed seat 20 is forcibly connected with the fork lever 92, if the tight pressing position of the spanner rod 30 is orientated downwards or forwards (i.e. not upwards), as shown in FIG. 4, the spanner rod 50 can be loosened in advance such that the spanner rod 50 is no longer pressed against the pressing block 32 of the movable seat 30, and then the movable seat 30 is pushed away under an elastic force of the spring 40 such that the movable seat engaging tooth 312 of the movable seat 30 is disengaged from the fixed seat engaging tooth 22 of the fixed seat 20.

Figure 5:
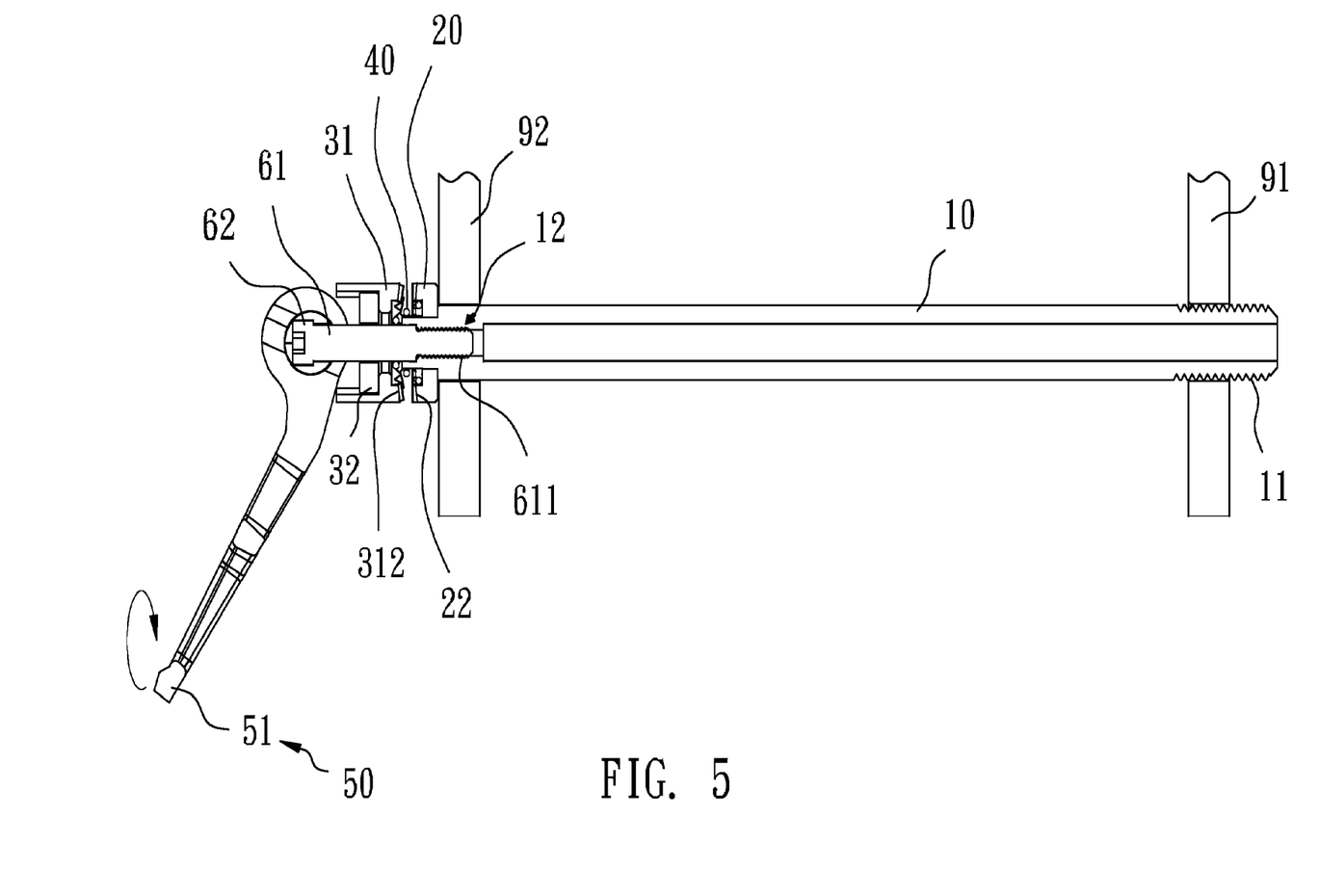
Figure 6:
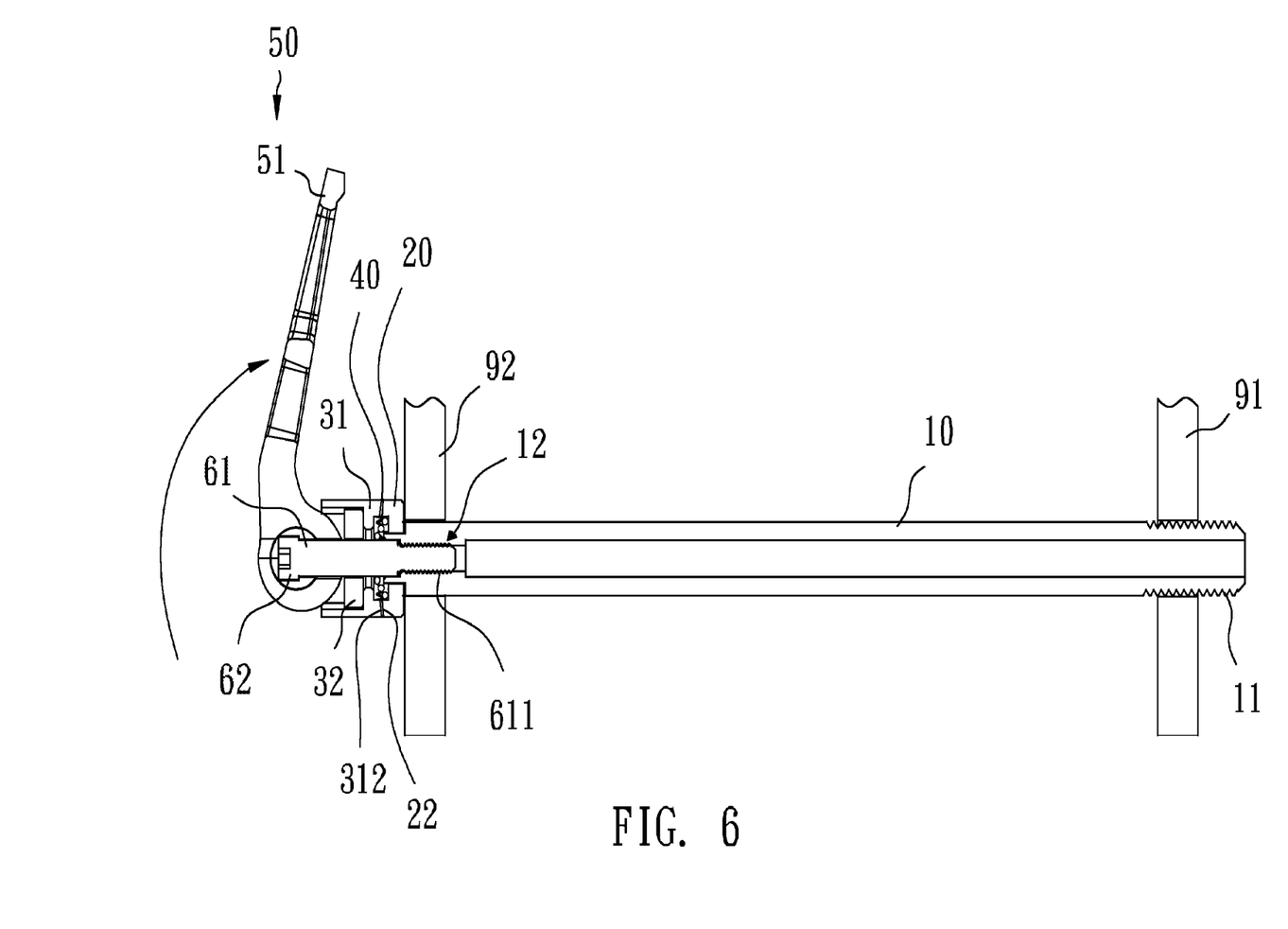

Next, after the spanner rod 50 is slightly rotated by a predetermined angle (as shown in FIG. 5), the spanner rod 50 is rotated again and wrenched (as shown in FIG. 6), such that the spanner rod 50 can press the movable seat 30, and the movable seat engaging tooth 312 of the movable seat 30 is engaged again with the fixed seat engaging tooth 22 of the fixed seat 20, thus the spanner rod 50 can be wrenched upwards.

Accordingly, when a user rides a bicycle, the spanner rod 50 may not be disengaged when hit by foreign matter on the ground, thus improving the safety in use.

Furthermore, in the invention, when the spanner rod 50 is loosened, the fixed seat 20 remains tightly pressed against the fork lever 92, and the movable seat 30 is pushed away by the spring 40 only, thus the fork lever 92 may not be repeatedly tightly pressed for many times. This can not only prevent the fork lever 92 from being damaged, but also reduce the wear among various members of the invention, thereby achieving the effect of increasing the service life.

Figure 7:
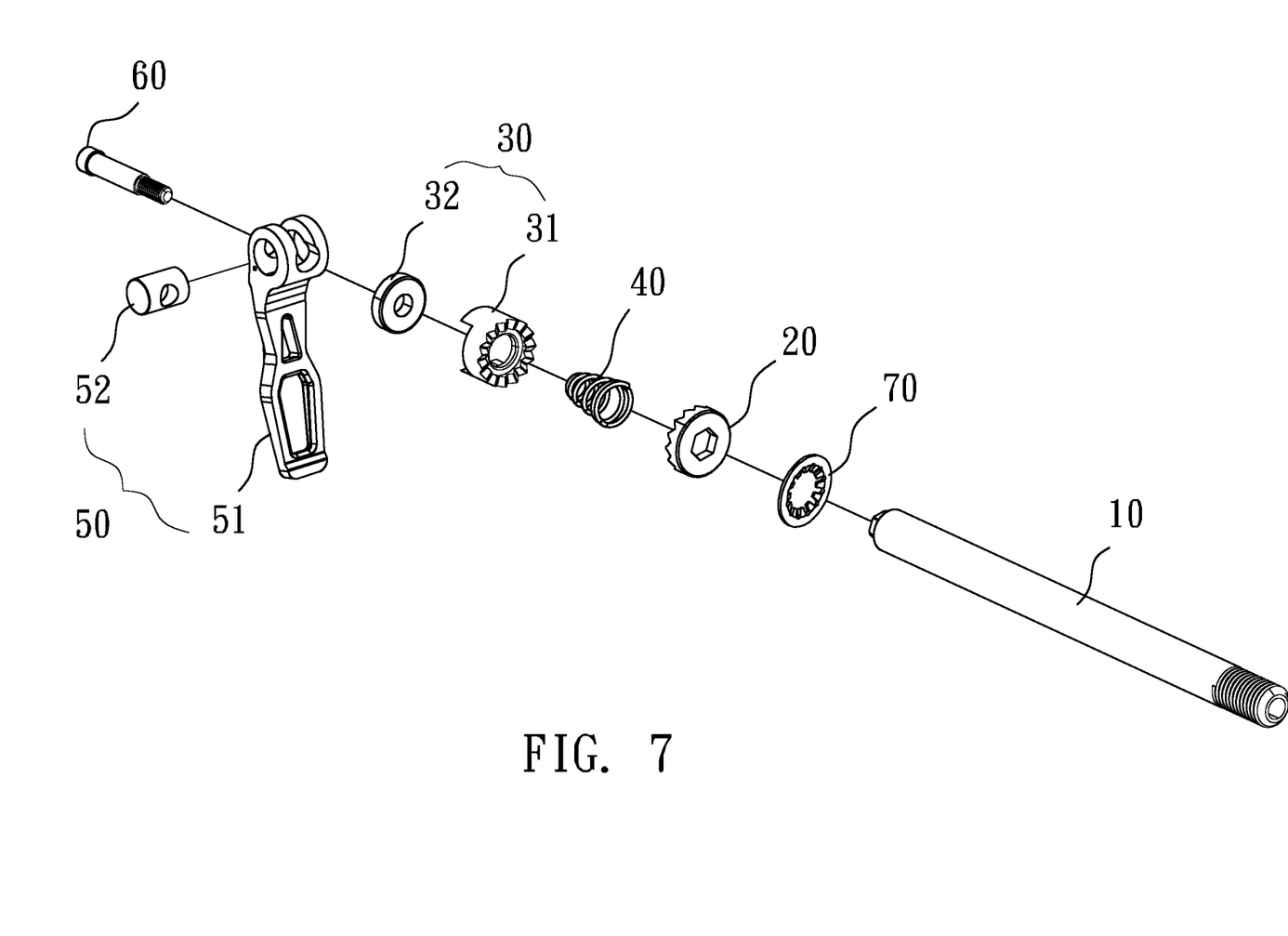
FIG. 7 is an exploded perspective view of another embodiment of the invention.

Referring to FIG. 7, the above embodiment may further comprise a spring washer 70 which is disposed between the fixed seat 20 and the shaft lever 10 to provide a predetermined elastic force for the fixed seat 20, thus the accumulated tolerance can be adjusted to prevent the fixed seat 20 from failing to engaged with the movable seat 30.

The above disclosures are merely preferred embodiments of the invention and are not intended to limit the implementation scope of the invention. All equivalent changes made by those skilled in the art according to the invention shall fall within the scope covered by the invention.

What is claimed is:

1. A quick-release structure, comprising:
a shaft lever having a shaft lever external thread at one end thereof and a shaft lever internal thread at another end thereof;
a fixed seat sheathed on the shaft lever in a non-rotatable manner relative to each other, the fixed seat having an annular fixed seat engaging tooth on one end face thereof;
a movable seat having an axially penetrating perforation, the movable seat having an annular movable seat engaging tooth on one end face thereof, and the movable seat engaging tooth facing the fixed seat engaging tooth of the fixed seat;
a spring abutting between the fixed seat and the movable seat;
a spanner rod having a pivoting hole; and
a connecting shaft, one end of which abuts on the spanner rod, and another end of which has a connecting shaft external thread and sequentially passes through the pivoting hole of the spanner rod, the perforation of the movable seat and the spring so as to be screwed into the shaft lever internal thread of the shaft lever;
when the spanner rod presses the movable seat, the movable seat engaging tooth of the movable seat is engaged with the fixed seat engaging tooth of the fixed seat; and
when the spanner rod releases the movable seat, the movable seat is pushed away by the spring such that the movable seat engaging tooth is disengaged from the fixed seat engaging tooth.

2. The quick-release structure according to claim 1, wherein the shaft lever has a rotation limiting portion located on a same end face as the shaft lever internal thread, and the rotation limiting portion has a non-circular section; and the fixed seat has an axially penetrating rotation limiting hole, a section of the rotation limiting hole is complementary to that of the rotation limiting portion of the shaft lever, and the rotation limiting portion of the shaft lever is sheathed in the rotation limiting hole of the fixed seat.

3. The quick-release structure according to claim 2, wherein the rotation limiting portion is a hexagonal column and the rotation limiting hole is a hexagonal hole.

4. The quick-release structure according to claim 1, wherein the movable seat has a seat body and a pressing block, the perforation axially penetrates through the seat body, the movable seat engaging tooth is located on one end face of the seat body, a pressing chamber communicated with the perforation is recessed on another end face of the seat body, the pressing block is disposed in the pressing chamber of the seat body and has an axially penetrating through hole, the through hole is communicated with the perforation, and the pressing block is pressed by the spanner rod.

5. The quick-release structure according to claim 4, wherein the pressing block is integrally formed and elastic.

6. The quick-release structure according to claim 4, wherein the aperture of the pressing chamber has an inner diameter that is greater than a diameter of the perforation, and an outer diameter of the pressing block is also greater than the diameter of the aperture of the perforation but smaller than the inner diameter of the pressing chamber.

7. The quick-release structure according to claim 1, wherein the spanner rod has a rod body and a pivoting seat; and the rod body has a pivoting chamber at one end thereof, the pivoting seat is arranged in the pivoting chamber of the rod body in a movable pivoting manner, and the pivoting hole penetrates through the pivoting seat.

8. The quick-release structure according to claim 1, wherein the connecting shaft has a body and a head connected at one end of the body, an outer diameter of the head being greater than an outer diameter of the body, the connecting shaft external thread located on the body, the head abuts on abutting the spanner rod, and the body passes through the pivoting hole, the perforation and the spring.

9. The quick-release structure according to claim 1, further comprising a spring washer which is disposed between the fixed seat and the shaft lever to provide a predetermined elastic force for the fixed seat.

\* \* \* \* \*